(12) United States Patent
Misawa et al.

(10) Patent No.: US 10,578,864 B2
(45) Date of Patent: Mar. 3, 2020

(54) HEAD-UP DISPLAY DEVICE (71) Applicant: Maxell, Ltd., Kyoto (JP)

(72) Inventors: Akio Misawa, Oyamazaki (JP); Maki Hanada, Oyamazaki (JP); Yuji Fujita, Oyamazaki (JP)

(73) Assignee: Maxell, Ltd., Kyoto (JP)

( * ) Notice: Subject to any disclaimer, the term of this patent is extended or adjusted under 35 U.S.C. 154(b) by 135 days.

(21) Appl. No.: 15/766,388

(22) PCT Filed: Oct. 9, 2015

(86) PCT No.: PCT/JP2015/078704
§ 371 (c)(1),
(2) Date: Apr. 6, 2018

(87) PCT Pub. No.: WO2017/061019
PCT Pub. Date: Apr. 13, 2017

(65) Prior Publication Data
US 2019/0086661 A1 Mar. 21, 2019

(51) Int. Cl.
*G02B 27/14* (2006.01)
*G09G 5/00* (2006.01)
(Continued)

(52) U.S. Cl.
CPC .......... *G02B 27/0101* (2013.01); *B60K 35/00* (2013.01); *B60K 2370/1529* (2019.05);
(Continued)

(58) Field of Classification Search
CPC ........ G02B 27/0101; G02B 2027/0127; G02B 2027/014; G02B 2027/0181;
(Continued)

(56) References Cited

U.S. PATENT DOCUMENTS

2009/0160736 A1 6/2009 Shikita
2013/0265646 A1 10/2013 Sakai
(Continued)

FOREIGN PATENT DOCUMENTS

JP 06-87043 A 12/1994
JP 2004-168230 A 6/2004
(Continued)

OTHER PUBLICATIONS

Japanese Office Action received in corresponding Japanese Application No. 2017-544143 dated Dec. 4, 2018.
(Continued)

*Primary Examiner* — William Choi
(74) *Attorney, Agent, or Firm* — Mattingly & Malur, PC (57) ABSTRACT The head-up display device projects a virtual image and includes: an image processor that processes an image to be displayed as a virtual image; an image display that projects the processed image; and a display controller that controls the displaying of the image display. The image display includes: a projector that projects an image; a diffusion plate that forms the image projected by the projector; and a lens that guides the image formed by the diffusion plate. The diffusion plate is constituted by a plurality of functional liquid crystal films that are located at different distances
(Continued)

from the lens. The display controller is configured such that, by controlling a transmissive state and a white state of each functional liquid crystal film, the position and distance for displaying the virtual image can be changed.

9 Claims, 9 Drawing Sheets

(51) Int. Cl.
    *G02B 27/01*     (2006.01)
    *B60K 35/00*     (2006.01)
(52) U.S. Cl.
    CPC .... *B60K 2370/23* (2019.05); *B60K 2370/334* (2019.05); *G02B 2027/014* (2013.01); *G02B 2027/0127* (2013.01); *G02B 2027/0181* (2013.01); *G02B 2027/0183* (2013.01); *G02B 2027/0185* (2013.01)
(58) Field of Classification Search
    CPC .... G02B 2027/0183; G02B 2027/0185; B60K 35/00; B60K 2370/1529; B60K 2370/23; B60K 2370/334

USPC .................................. 359/630, 638; 345/7–9
See application file for complete search history.

(56) References Cited

U.S. PATENT DOCUMENTS

| | | |
|---|---|---|
| 2014/0036374 A1 | 2/2014 | Lescure et al. |
| 2015/0061976 A1 | 3/2015 | Ferri |
| 2015/0370075 A1* | 12/2015 | Ato .................... G02B 27/017 359/240 |

FOREIGN PATENT DOCUMENTS

| | | |
|---|---|---|
| JP | 2009-150947 A | 7/2009 |
| JP | 2013-214008 A | 10/2013 |
| JP | 2015-215476 A | 12/2015 |

OTHER PUBLICATIONS

International Search Report of PCT/JP2015/078704 dated Dec. 22, 2015.

* cited by examiner

HEAD-UP DISPLAY DEVICE

TECHNICAL FIELD

The present invention relates to a head-up display device, and more particularly, to a head-up display device with which it is possible to change a position and a distance for displaying a virtual image.

BACKGROUND ART

In a head-up display device (Head Up Display: hereinbelow, abbreviated to "HUD"), e.g., a vehicle HUD, it is known that a driver's visual line movement is reduced as much as possible by remote display of driving information necessary for driving as a virtual image via a windshield.

As a background of the present technical field, Japanese Unexamined Patent Application Publication No. 2004-168230 (Patent Literature 1) is known. Patent Literature 1 discloses a configuration, having plural display panels at different optical path distances, with which it is possible to change the distance from a driver's eyes position to a display position for a virtual image without a moving mechanism, by selecting a display panel to display information, for the purpose of selective display of virtual images at different distances from the driver's eyes position to the displayed virtual images without a moving mechanism.

CITATION LIST

Patent Literature

PTL 1: Japanese Unexamined Patent Application Publication No. 2004-168230

SUMMARY OF INVENTION

Technical Problem

In Patent Literature 1, it is assumed that as the display panel, a liquid crystal display device requiring a backlight, a fluorescent display tube, or a display device using electroluminescence is used. An image is generated with the display panel. As control of the display panel is complicated in accordance with the number of faces of the display panel, and as the transmissivity is lowered by transmission through e.g. the liquid crystal display device, the optical loss is increased.

The object of the present invention is to provide an HUD, with a simple configuration and with small optical loss, which is made in view of the above-described problem, and with which it is possible to change a position and a distance for displaying a virtual image.

Solution to Problem

To solve the above object, the present invention provides, as an example, a head-up display device to project a virtual image, including an image processor that performs image processing on an image to be displayed as a virtual image, an image display that projects the image-processed image, and a display controller that performs display control on the image display. The image display has a projector that projects an image, a diffusion plate that image-forms the image projected with the projector, and a lens that guides the image image-formed with the diffusion plate. The diffusion plate is formed with plural functional liquid crystal films at different distances from the lens. The display controller controls a transmissive state and a white state of each functional liquid crystal film so as to change a position and a distance for displaying the virtual image. Note that the functional liquid crystal film is a liquid crystal film which electrically controls the transmissive state and the white state.

Advantageous Effects of Invention

According to the present invention, it is possible to provide an HUD, with a simple configuration and with small optical loss, with which it is possible to change a position and a distance for displaying a virtual image.

DESCRIPTION OF EMBODIMENTS

Hereinbelow, embodiments of the present invention will be described using the drawings.

EXAMPLE 1

In the present example, an example where in a vehicle HUD, a display position for a virtual image and a distance from a driver's eyes to the virtual image are changed in accordance with change of vehicle speed, will be described.

A vehicle HUD, as a premise in the present example, projects driving information such as speed display, navigation display or the like, as a virtual image, while overlays the image on a foreground of a front visual field on the other side of a windshield viewed from the driver. Then in visual observation of the driving information, it is necessary to appropriately set the position and distance for displaying the virtual image where the driving information is projected, i.e., the distance from the driver's eyes to the display position for the virtual image, such that the driver's visual line movement is reduced as much as possible, i.e., the driving information is observed in a state where the driver's eyes are focused on the foreground of the front visual field. Note that generally, a driver's visual line changes to a distance in accordance with increase in the vehicle speed. Accordingly, it is preferable to change the position and distance for displaying a virtual image in accordance with vehicle speed. It is possible to improve the visibility of a displayed virtual image by changing the position and distance for displaying the virtual image displayed in a vehicle front position in accordance with increase in vehicle speed.

Figure 1A:
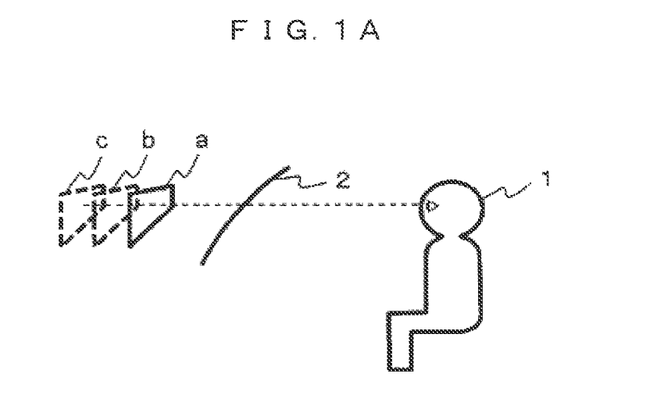
FIG. 1A is an image diagram of changing a distance to a display position for a virtual image in accordance with change of vehicle speed in an example 1.

FIG. 1A shows an image diagram of changing a distance from the driver's eyes to a display position for a virtual image in accordance with vehicle speed. In FIG. 1A, numeral 1 denotes the driver; 2, a windshield; and alphabets a, b, and c display positions for a virtual image respectively changed in accordance with increase in the vehicle speed. The display position a shows a case where the distance from the driver is short and the vehicle speed is a low speed. Further, the display position b shows a case where the speed is a medium speed higher than that in the case of the display position a, and control is performed such that the distance from the driver is longer than that in the case of the display position a. Further, the display position c shows a case where the vehicle speed is higher than that in the case of the display position b, and control is performed such that the distance from the driver is farther than that in the case of the display position b.

Figure 1B:
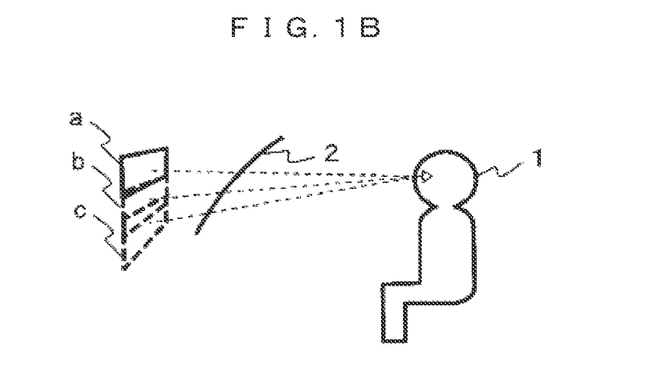
FIG. 1B is an image diagram of changing the position and distance for displaying the virtual image in the example 1 in accordance with change of vehicle speed to change an overlook angle from a driver's eyes.

Further, as the driver's visual line changes in accordance with increase in the vehicle speed, it is preferable to also change the angle from the driver's eyes to the display position for the virtual image in a downward direction with respect to a horizontal line, hereinafter, overlook angle. FIG. 1B shows an image diagram of changing the display position for the virtual image in accordance with change of vehicle speed, and changing the overlook angle from the driver's eyes. In FIG. 1B, the display position a shows a case where the overlook angle from the driver's eyes is high and the vehicle speed is a high speed. Further, the display position b shows a case where the vehicle speed is a medium speed lower than that in the case of the display position a, and control is performed such that the overlook angle from the driver's eyes is lower than the display position a. Further, the display position c shows a case where the vehicle speed is lower than that in the case of the display position b, and control is performed such that the overlook angle from the driver's eyes is lower than the display position b.

Figure 1C:
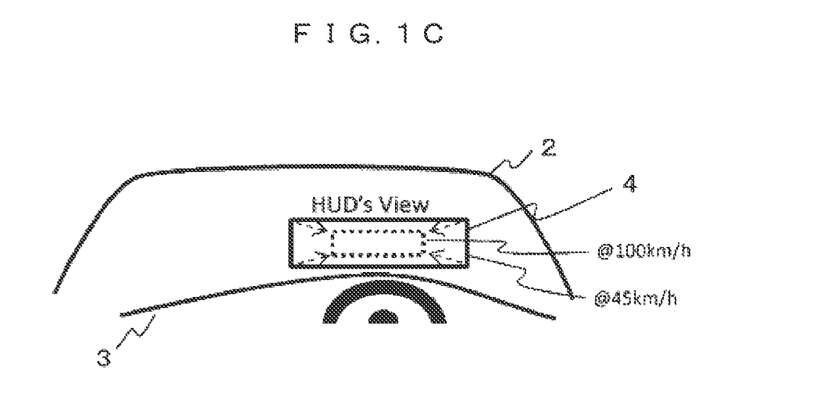
FIG. 1C is an image diagram of changing a display area for the virtual image in the example 1 in accordance with change of vehicle speed.

Further, as the driver's visual line changes to a distance in accordance with increase in the vehicle speed, it is preferable to also change a display range for the virtual image. FIG. 1C shows an image diagram of changing the display area for the virtual image in accordance with change of vehicle speed. FIG. 1C shows an HUD display area 4 for projection as a virtual image overlay-displayed on the foreground of the front visual field on the other side of the windshield 2 viewed from the driver. Numeral 3 denotes an instrument panel. In FIG. 1C, for example, when the vehicle speed is 45 km/h, the HUD display area 4 is a display area within a shown bold frame. On the other hand, when the vehicle speed becomes a high speed of 100 km/h, it is reduced to a display area within a shown dotted frame.

Figure 2:
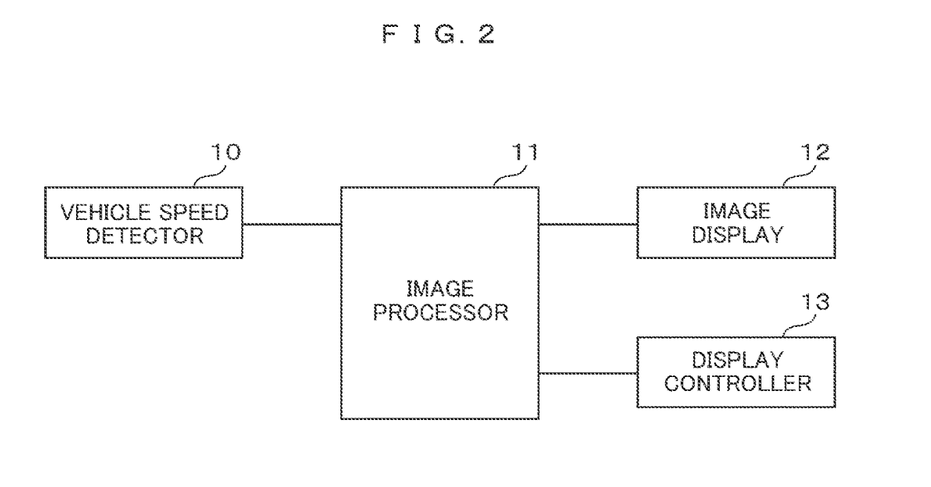
FIG. 2 is a functional block diagram of an HUD in the example 1.
Figure 3:
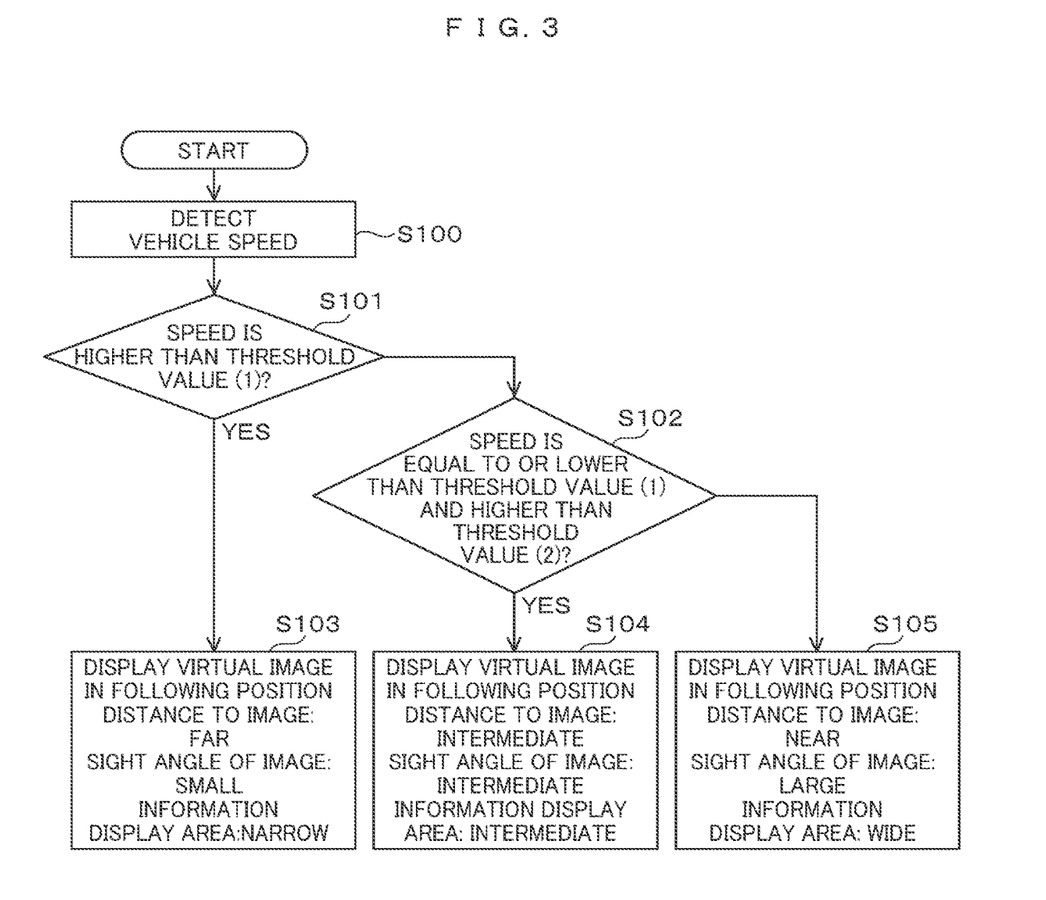
FIG. 3 is a processing flow diagram of the HUD in the example 1.

FIG. 2 shows a functional block diagram of the HUD, and FIG. 3 shows a processing flow diagram, in the above-described case of changing the display position, the distance and the range for a virtual image in accordance with change of vehicle speed.

In FIG. 2, numeral 10 denotes a vehicle speed detector to detect the vehicle speed; 11, an image processor to perform image processing to display image information to be displayed as a virtual image; 12, an image display to project an image, formed with a projector, a liquid crystal device or the like, to be described later; and 13, a display controller to control the image display 12 to change the display position and the range for the virtual image.

Further, in the processing flow of FIG. 3, the vehicle speed is detected with the vehicle speed detector 10 at step 100 (S100). At step 101 (S101), it is determined whether or not the detected vehicle speed is higher than a threshold value (1). Note that as the threshold value (1), in the relation between the threshold and a threshold value (2) to be descried later, when the vehicle speed is divided into three stages, a low speed, a medium speed, and a high speed, a border speed between the high speed and the medium speed is set as the threshold value (1), and a border speed between the medium speed and the low speed is set as the threshold value (2). Then when the vehicle speed is higher than the threshold value (1), it is determined that the vehicle speed is a high speed. At step 103 (S103), the display position and the range for the virtual image when the vehicle speed is a high speed are set. That is, the distance from the driver's eyes to the display position for the virtual image is set to a long distance, the overlook angle from the driver's eyes is set to a small angle, and the display range for the virtual image is set to a narrow range.

Further, when it is determined at step 101 that the vehicle speed is equal to or lower than the threshold value (1), the process proceeds to step 102 (S102), at which it is determined whether or not the vehicle speed is equal to or lower than the threshold value (1) and higher than the threshold value (2). Then, when the vehicle speed is equal to or lower than the threshold value (1) and higher than the threshold value (2), it is determined that the vehicle speed is a medium speed. At step 104 (S104), the display position and the range for the virtual image when the vehicle speed is a medium speed are set. That is, the distance from the driver's eyes to the display position for the virtual image is set to an intermediate distance, the overlook angle from the driver's eyes is also set to an intermediate angle, and the display range for the virtual image is also set to an intermediate range.

Further, when it is determined at step 102 that the vehicle speed is equal to or lower than the threshold value (2), the process proceeds to step 105 (S105), at which the display position and the range for the virtual image when the vehicle speed is a low speed are set. That is, the distance from the driver's eyes to the display position for the virtual image is set to a short distance, the overlook angle from the driver's eyes is set to a large angle, and the display range for the virtual image is set to a wide range. Note that in the above description, the vehicle speed is divided into three speeds; however, the number of divided speeds is not limited to three. The speed may be divided in larger number of speeds.

Next, a particular configuration of the above-described image display 12 to change the display position and the range for the virtual image in accordance with change of vehicle speed, explained in the functional block diagram of FIG. 2 and the processing flowchart of FIG. 3, will be described.

Figure 4A:
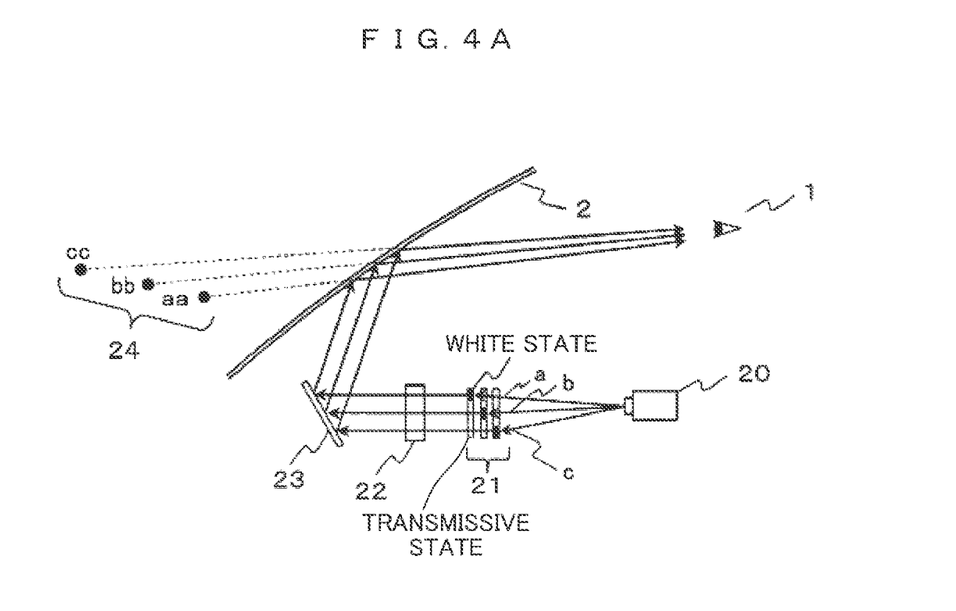
FIG. 4A is a configuration diagram of an image display in the example 1.

FIG. 4A is a configuration diagram explaining the configuration of the image display in the present example. In FIG. 4A, the image display has a projector 20, a diffusion plate 21, a lens 22, and a free-curved surface mirror 23. Further, the diffusion plate 21 is formed with plural functional liquid crystal films. The functional liquid crystal film electrically controls a transmissive state and a white state.

As a white state part of the functional liquid crystal film functions as a diffusion plate, an image projected with the projector 20 is image-formed in the white state part of the functional liquid crystal film. Accordingly, a virtual image display position 24 is determined in accordance with distance between the white state part of the functional liquid crystal film and the lens 22. Therefore it is possible to change the distance of the display position for the virtual image by providing plural functional liquid crystal films at different distances from the lens 22, and setting any one functional liquid crystal film of the functional liquid crystal films through which an image to be displayed is transmitted, to the white state.

For example, in FIG. 4A, regarding images a, b, and c projected with the projector 20, in the image a, a functional liquid crystal film at the shortest distance from the lens 22 is set to the white state. With this configuration, the display position for the virtual image is in a near position indicated with aa in the virtual image display position 24. On the other hand, in the image b, a functional liquid crystal film at an intermediate distance from the lens 22 is set to the white state. With this configuration, the display position for the virtual image is an intermediate position indicated with bb in the virtual image display position 24. Further, in the image c, a functional liquid crystal film at the longest distance from the lens 22 is set to the white state. With this configuration, the display position for the virtual image is a distant position indicated with cc in the virtual image display position 24.

Figure 4B:
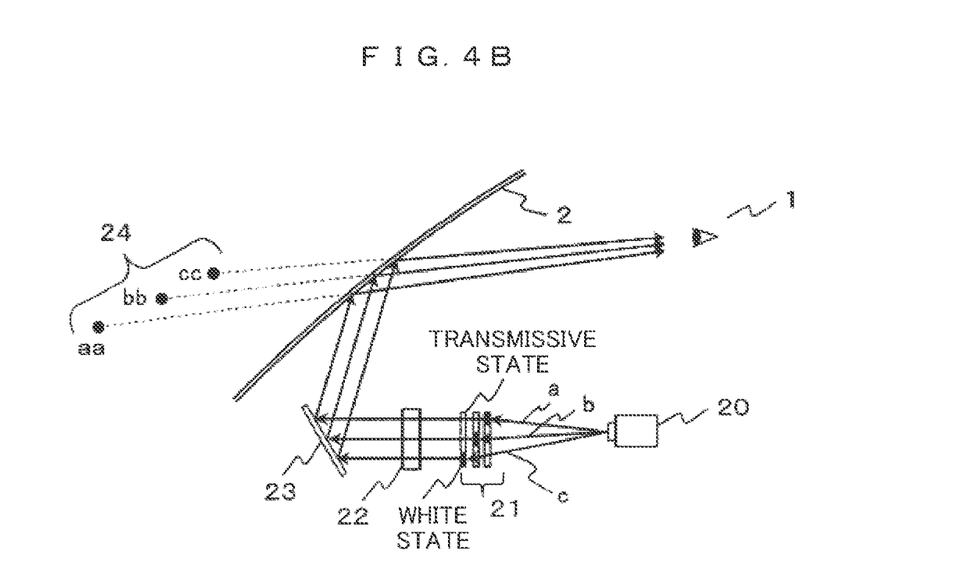
FIG. 4B is an explanatory diagram showing the position and distance for displaying the virtual image in a case where a white state of each functional liquid crystal film in the example 1 is different from that in FIG. 4A.

FIG. 4B is an explanatory diagram showing the display position for the virtual image in a case where the white state of each functional liquid crystal film is different from that in FIG. 4A. With the same operation as that described above, it is possible to change the display position for the virtual image to positions and distances different from those in FIG. 4A as indicated with aa, bb, and cc in the virtual image display position 24.

Figure 5A:
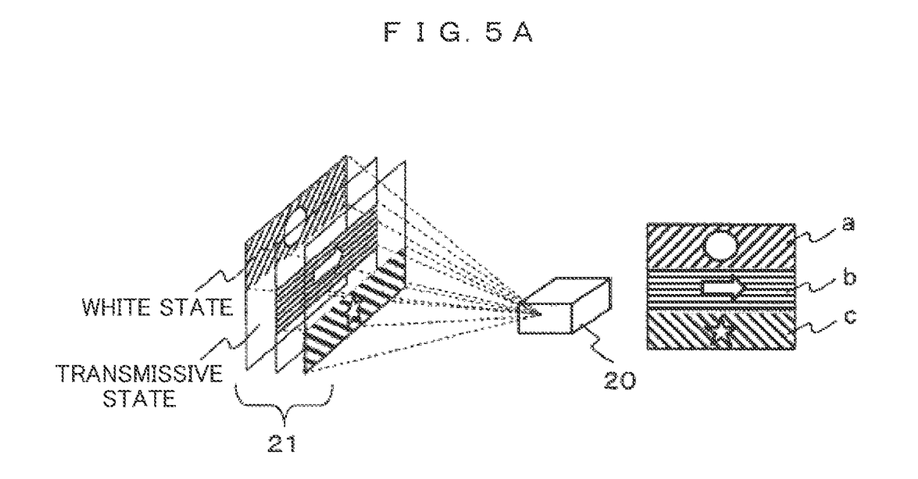
FIG. 5A is an explanatory diagram explaining a case where a display screen in the example 1 is displayed in a display position and at a distance different by part.
Figure 5B:
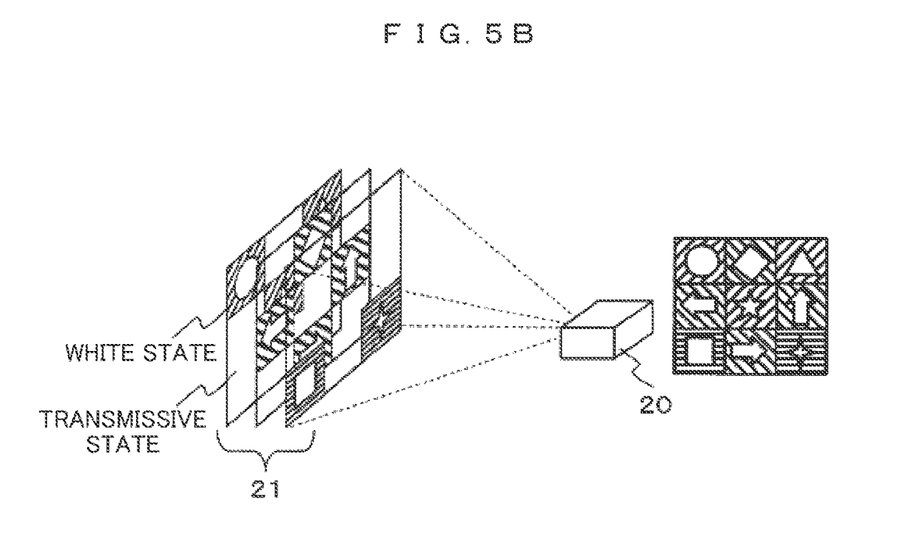
FIG. 5B is an explanatory diagram explaining another example where the display screen in the example 1 is displayed in the display position and at the distance different by part.

FIG. 5A and FIG. 5B are diagrams explaining a case where a display screen is displayed in a display position and at a distance different by part. In FIG. 5A, when the image projected with the projector 20 is divided into three columns, images a, b, and c, it is possible to realize display where the distance of the display position is different by vertical three columns, by setting the white state of each functional liquid crystal film forming the diffusion plate 21 by vertical three columns. Further, as shown in FIG. 5B, when the image projected with the projector 20 is divided into 3×3, 9 images, it is possible to realize display where the distance of the display position is different in nine-division unit, by setting the white state of each functional liquid crystal film forming the diffusion plate 21 by nine-division.

As described above, the present example provides an HUD to project a virtual image, with a configuration having an image processor to perform image processing on an image to be displayed as a virtual image, an image display to project the image-processed image, and a display controller to perform display control on the image display. The image display has a projector to project an image, a diffusion plate to image-form the image projected with the projector, and a lens to guide the image image-formed with the diffusion plate. The diffusion plate is formed with plural functional liquid crystal films at different distances from the lens. The display controller controls a transmissive state and a white state of the functional liquid crystal film, to change a position and a distance for displaying the virtual image.

Further, the HUD is mounted in a vehicle. The image display reflects the image guided with the lens with a second mirror, to project a virtual image from the reflected image via the windshield of the vehicle, and it has a vehicle speed detector to detect the vehicle speed. The display controller performs control in accordance with vehicle speed.

With this configuration, it is possible to provide an HUD, with a simple configuration and with small optical loss, with which it is possible to change a position and a distance for displaying a virtual image.

EXAMPLE 2

Figure 6:
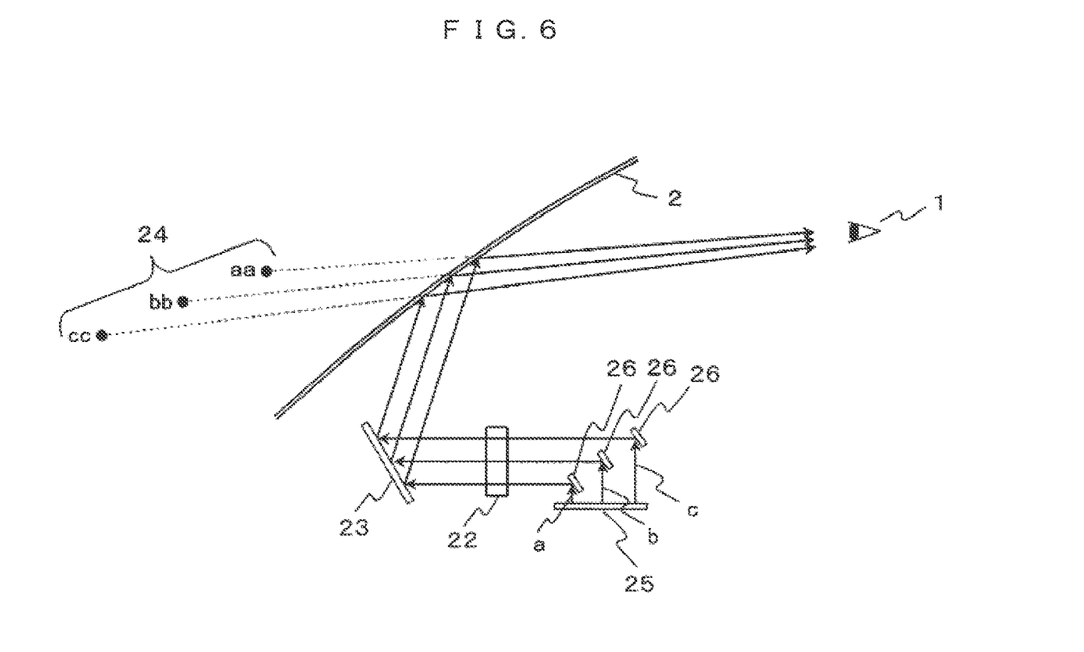
FIG. 6 is a configuration diagram of the image display in an example 2.

In the present example, another configuration of the image display will be described. FIG. 6 is a configuration diagram of the image display in the present example. In FIG. 6, numeral 25 denotes a liquid crystal display; and 26, mirrors. The plural mirrors 26 are provided behind the liquid crystal display 25.

In FIG. 6, the image from the liquid crystal display 25 arrives via the mirrors 26 at the lens 22. The virtual image display position 24 is determined in accordance with distance between the liquid crystal display 25 and the lens 22. Accordingly, for example, in the case of shown images a, b, and c, in comparison with the distance from the image a to the lens 22, the distance from the image c to the lens 22 is longer. The virtual image display position cc for the image c is remote in comparison with the virtual image display position aa for the image a. Accordingly, by determining the display position of the liquid crystal display 25 to a, b, or c, it is possible to control the distance for the virtual image display position.

As described above, the present example provides a head-up display device to project a virtual image, with a configuration having an image processor to perform image processing on an image to be displayed as a virtual image, an image display to project the image-processed image, and a display controller to perform display control on the image display. The image display has a liquid crystal display to display an image, plural mirrors to reflect the image displayed with the liquid crystal display, and a lens to guide the image from the mirror. The plural mirrors are provided in positions at different distances from the lens. The display controller controls the display position of the liquid crystal display corresponding to the plural mirrors so as to change the position and distance for displaying the virtual image.

With this configuration where the plural mirrors are provided behind the liquid crystal display, it is possible to change the distance to the lens by area of the liquid crystal display, to change the distance for the virtual image.

EXAMPLE 3

Figure 7:
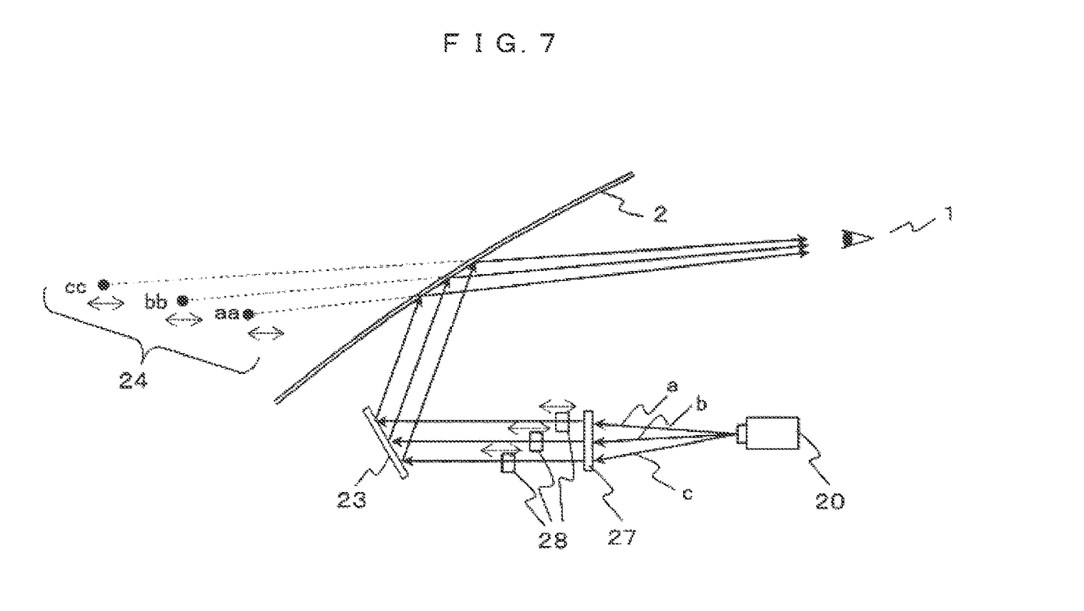
FIG. 7 is a configuration diagram of the image display in an example 3.

In the present example, another configuration of the image display will be described. FIG. 7 is a configuration diagram of the image display in the present example. In FIG. 7, numeral 27 denotes a diffusion plate; and 28, a movable lens.

In FIG. 7, the image projected with the projector 20 is image-formed with the diffusion plate 27. The image is reflected via the movable lens 28 with the free-curved surface mirror 23. A virtual image is projected in front of the driver 1's eyes via the windshield 2. The virtual image display position 24 is determined in accordance with distance between the diffusion plate 27 and the movable lens 28. Accordingly, it is possible to change the virtual image display position 24 by moving the position of the movable lens 28.

As described above, the present example provides a head-up display device to project a virtual image, with a configuration having an image processor to perform image processing on an image to be displayed as a virtual image, an image display to project the image-processed image, and a display controller to perform display control on the image display. The image display has a projector to project an image, a diffusion plate to image-form the image projected with the projector, and a movable lens to guide the image image-formed with the diffusion plate. The display controller controls the position of the movable lens from the diffusion plate so as to change the position and distance for displaying the virtual image.

With this configuration where the lens is movable type lens in plural areas, it is possible to change the distance for the virtual image by area.

EXAMPLE 4

Figure 8A:
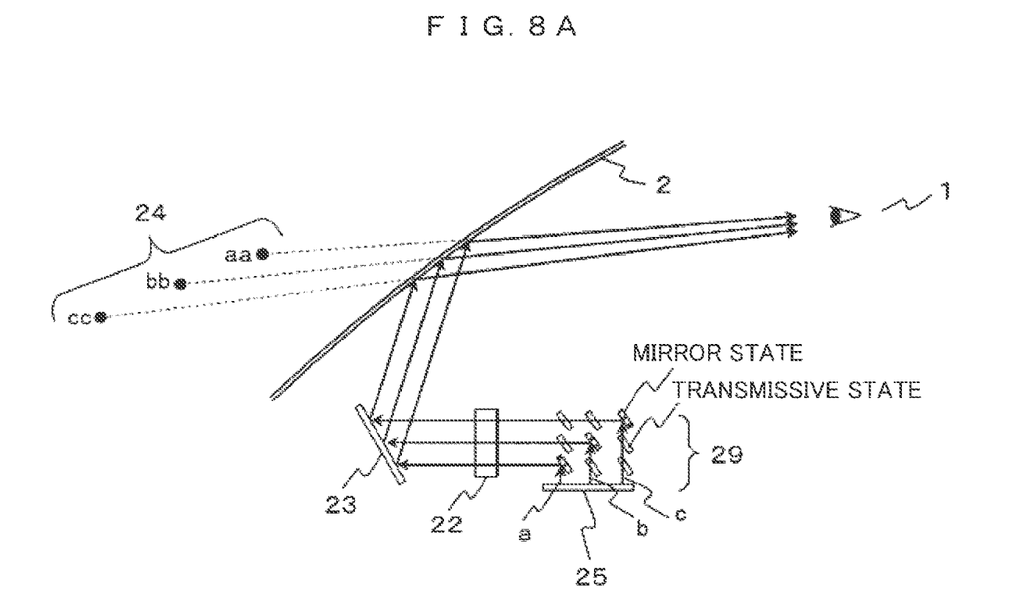
FIG. 8A is a configuration diagram of the image display in an example 4.

In the present example, another configuration of the image display will be described. FIG. 8A is a configuration diagram of the image display in the present example. In FIG. 8A, numeral 29 denotes light control mirrors. The plural (a large number of layers of) light control mirrors 29 are provided behind the liquid crystal display 25. The distance from the liquid crystal display 25 to the lens 22 is changed by controlling the light control mirror 29, and it is possible to change the distance for the virtual image. Note that the light control mirror is a mirror which electrically controls the transmissive state and the mirror state.

In FIG. 8A, for example, in the shown images a, b, and c, regarding the image a, a light control mirror 29 the nearest to the liquid crystal display 25 is set to the mirror state. Regarding the image b, a light control mirror 29 the second nearest to the liquid crystal display 25 is set to the mirror state. Regarding the image c, a light control mirror 29 the farthest from the liquid crystal display 25 is set to the mirror state. Regarding the image a, since the distance from the liquid crystal display 25 to the lens 22 is the shortest, the virtual image display position 24 is displayed in a short position as indicated with aa. On the other hand, regarding the image c, since the distance from the liquid crystal display 25 to the lens 22 is the longest, the virtual image display position 24 is displayed in a remote position indicated with cc.

As described above, the present example provides a head-up display device to project a virtual image, with a configuration having an image processor to perform image processing on an image to be displayed as a virtual image, an image display to project the image-processed image, and a display controller to perform display control on the image display. The image display has a liquid crystal display to display an image, and a lens, with plural light control mirrors to reflect or transmit the image displayed with the liquid crystal display, to guide the image from the plural light control mirrors. The plural light control mirrors contain mirrors provided in positions at different distances from the lens, and mirrors provided in positions at different distances from the liquid crystal display. The display controller controls reflection and transmission with the plural light control mirrors so as to change the position and distance for displaying the virtual image.

With this configuration where the plural light control mirrors are provided behind the liquid crystal display and the light control mirrors are controlled, it is possible to change the distance from the liquid crystal display to the lens and change the position and distance for displaying the virtual image.

Figure 8B:
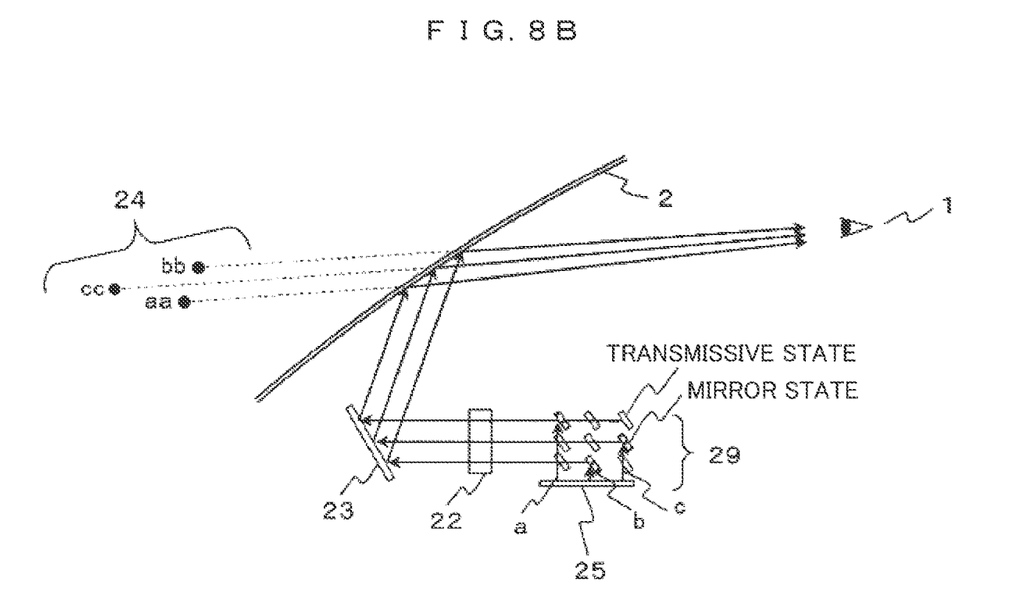
FIG. 8B is an explanatory diagram showing the position and distance for displaying the virtual image in a case where the state of each light control mirror in the example 4 is different from that in FIG. 8A.

FIG. 8B is an explanatory diagram showing the display position for the virtual image in a case where the mirror state of each light control mirrors is different from that in FIG. 8A. With the same operation as that described above, it is possible to change the display position for the virtual image to positions different from those in FIG. 8A as indicated with aa, bb, and cc in the virtual image display position 24.

Figure 9A:
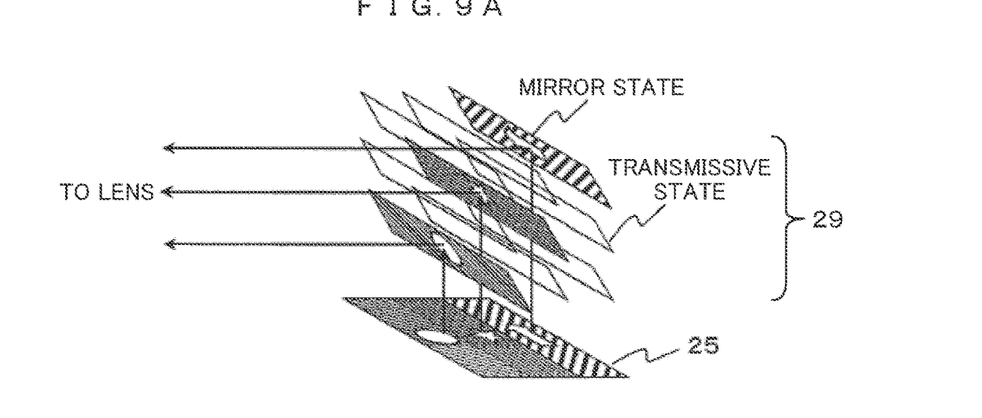
FIG. 9A is an explanatory diagram explaining a case where the display screen in the example 4 is displayed in a display position and at a distance different by part.
Figure 9B:
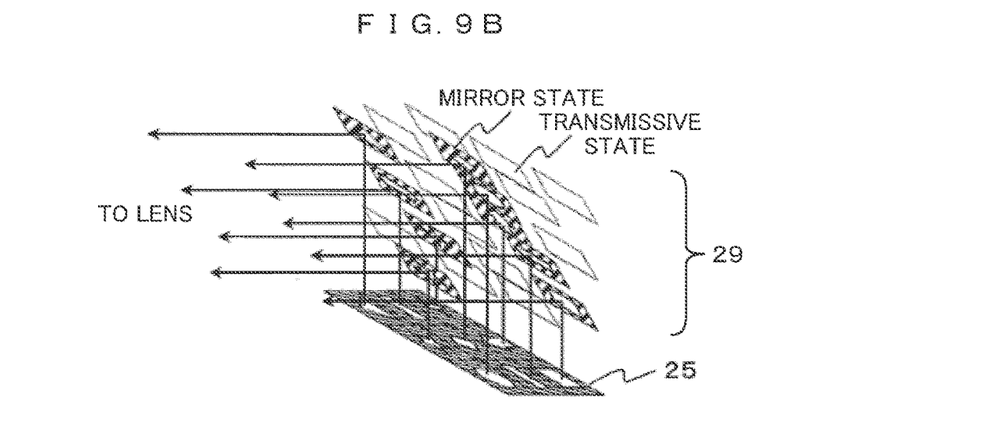
FIG. 9B is an explanatory diagram explaining another example where the display screen in the example 4 is displayed in the display position and at the distance different by part.

FIG. 9A and FIG. 9B are diagrams explaining a case where the display screen is displayed in a display position and at a distance different by part. In FIG. 9A, when the image displayed with the liquid crystal display 25 is divided into e.g. three columns, the mirror/transmissive state of each light control mirrors 29 is set by vertical three columns. Thus it is possible to realize display where the distance of the display position is different in column unit. Further, as shown in FIG. 9B, when the image displayed with the liquid crystal display 25 is divided into 3×3, 9 images, the mirror/transmissive state of each light control mirror 29 is set in vertical three columns by nine-division. Thus it is possible to realize display where the distance of the display position is different in nine-division unit.

EXAMPLE 5

Figure 10:
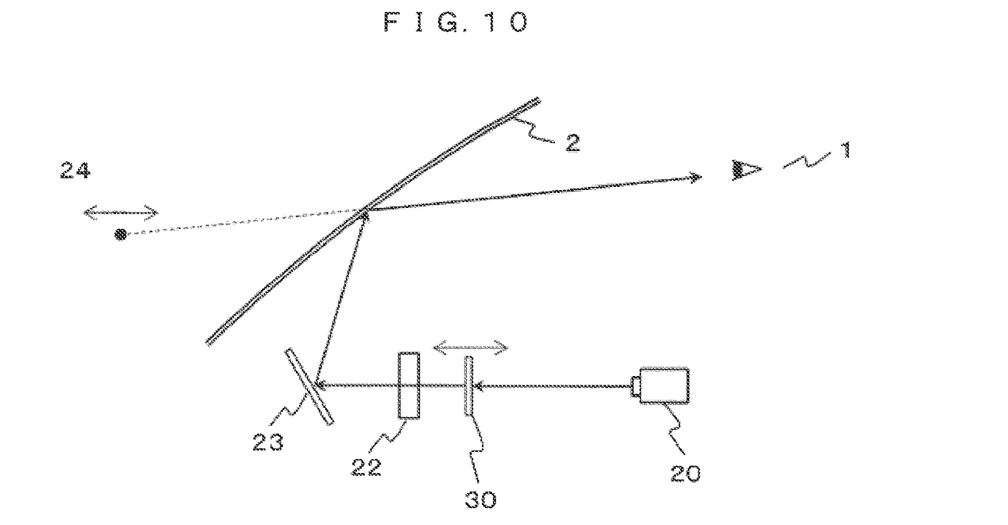
FIG. 10 is a configuration diagram of the image display in an example 5.

In the present example, another configuration of the image display will be described. FIG. 10 is a configuration diagram of the image display in the present example. In FIG. 10, numeral 30 denotes a movable diffusion plate. The image projected with the projector 20 is image-formed with the movable diffusion plate 30, and is reflected via the lens 22 with the free-curved surface mirror 23. Then a virtual image is projected in front of the driver 1's eyes via the windshield 2.

In FIG. 10, the virtual image display position 24 is determined in accordance with distance between the movable diffusion plate 30 and the lens 22. Accordingly, it is possible to change the virtual image display position 24 by moving the position of the movable diffusion plate 30.

As described above, the present example provides a head-up display device to project a virtual image, with a configuration having an image processor to perform image processing on an image to be displayed as a virtual image, an image display to project the image-processed image, and a display controller to perform display control on the image display. The image display has a projector to project an image, a movable diffusion plate to image-form the image projected with a projector, and a lens to guide the image image-formed with the movable diffusion plate. The display controller controls the position of the movable diffusion plate from the lens so as to change the display distance for the virtual image.

With this configuration, it is possible to change the display distance for the virtual image by moving the position of the movable diffusion plate.

EXAMPLE 6

Figure 11A:
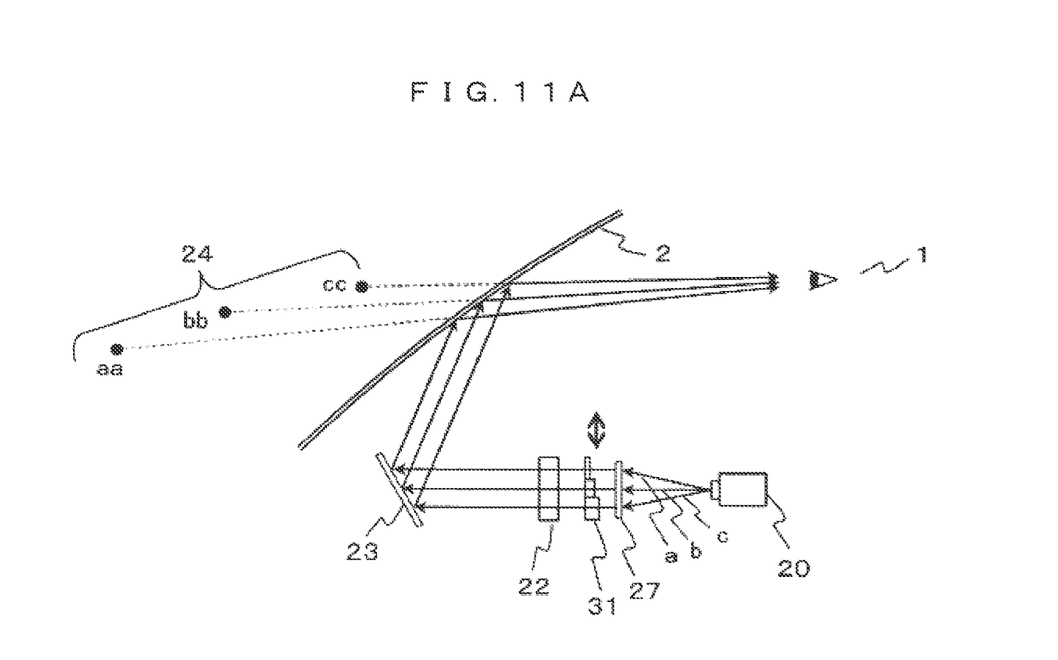
FIG. 11A is a configuration diagram of the image display in an example 6.

In the present example, another configuration of the image display will be described. FIG. 11A is a configuration diagram of the image display in the present example. In FIG. 11A, numeral 31 denotes a movable optical filter. The image projected with the projector 20 is image-formed with the diffusion plate 27, and is reflected via the movable optical filter 31 with the free-curved surface mirror 23. A virtual image is projected in front of the driver 1's eyes via the windshield 2. Note that the movable optical filter 31 has the same function as that of the lens. For example, it is an optical filter having a refractive index different by area. Then, when the focal distance of the movable optical filter 31 is long, the distance to the virtual image from the driver's eyes is short. In FIG. 11A, the movable optical filter 31 has a concave lens function, however, it may have a convex lens function.

Figure 11B:
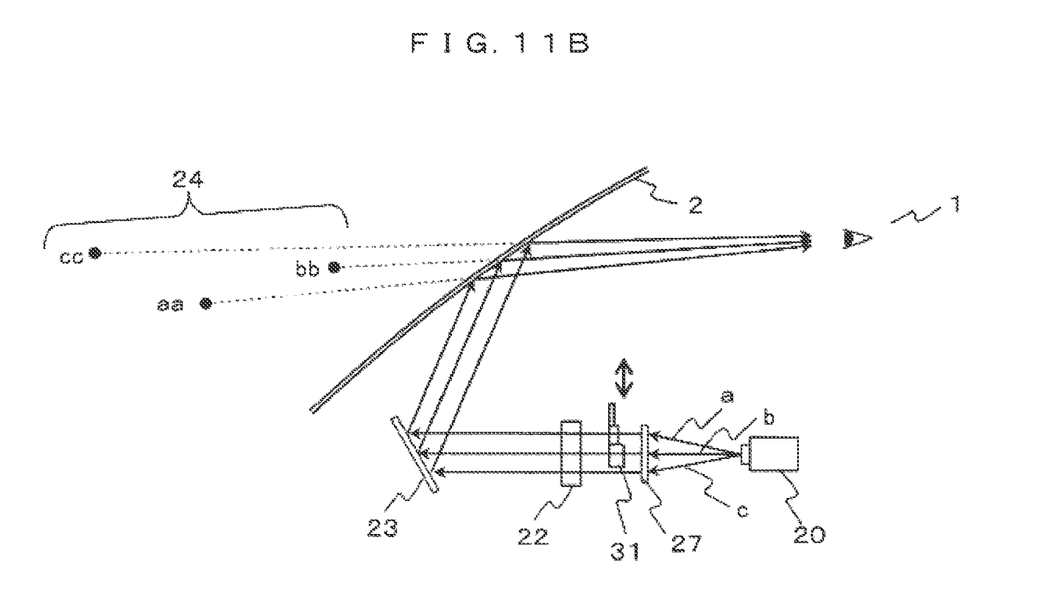
FIG. 11B is an explanatory diagram showing the position and distance for displaying the virtual image in a case where a movable optical filter in the example 6 is moved from a state in FIG. 11A.

In FIG. 11A, the movable optical filter 31 is inserted with respect to the images a, b, and c projected with the projector 20. When setting is made such that the focal distance of the movable optical filter 31 with respect to the image a is short, and the focal distance of the movable optical filter 31 with respect to the image c is long, as in the case of the shown virtual image display position 24, the display position for the virtual image with respect to the image a is a remote position as indicated with aa, and the display position for the virtual image with respect to the image c is a near position as indicated with cc. As shown in FIG. 11B, considering that when the movable optical filter 31 is moved such that it is omitted with respect to the image c, since the display position for the virtual image with respect to the image c is determined in accordance with the distance between the lens 22 and the diffusion plate 27, it is possible to change it to the position cc in the virtual image display position 24.

As described above, the present example provides a head-up display device to project a virtual image, with a configuration having an image processor to perform image processing on an image to be displayed as a virtual image, an image display to project the image-processed image, and a display controller to perform display control on the image display. The image display has a projector to project an image, a diffusion plate to image-form the image projected with the projector, and a movable optical filter and a lens to guide the image image-formed with the diffusion plate. The display controller inserts/omits the movable optical filter between the lens and the diffusion plate so as to change the position and distance for displaying the virtual image.

With this configuration, it is possible to change the position and distance for displaying the virtual image by inserting/omitting the movable optical filter between the lens and the diffusion plate.

EXAMPLE 7

In the present example, the configuration of the image display with a purpose of changing the display position for the virtual image to change the overlook angle from the driver's eyes will be described.

Figure 12:
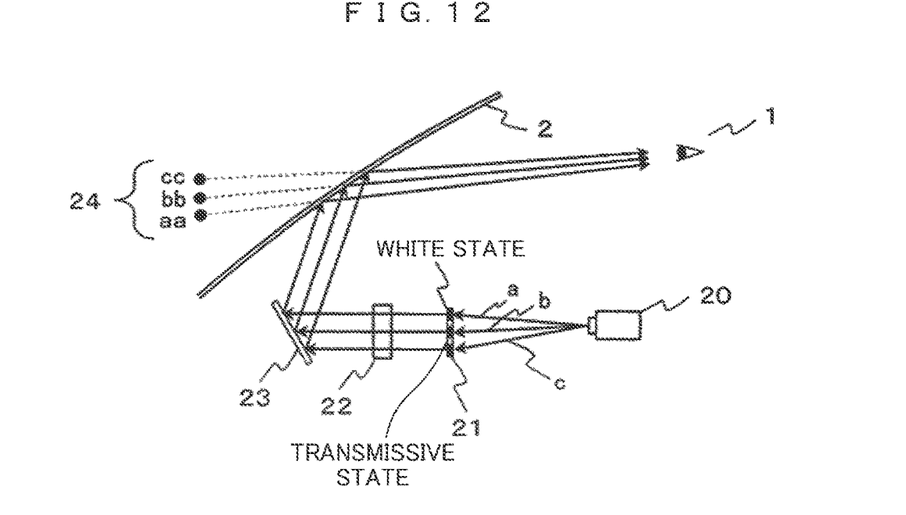
FIG. 12 is a configuration diagram of the image display in an example 7.

FIG. 12 shows a configuration diagram of the image display in the present example. FIG. 12 is basically the same as FIG. 4A, accordingly, explanations of the overlapped elements will be omitted. The difference is that the diffusion plate 21 is formed with one functional liquid crystal film.

As the white state part of the functional liquid crystal film functions as a diffusion plate, the image projected with the projector 20 is image-formed in the white state part of the functional liquid crystal film. On the other hand, since image formation is not performed with the transmissive state part of the functional liquid crystal film, a virtual image is not displayed.

The virtual image display position 24 is determined in accordance with the positional relationship between the white state part of the functional liquid crystal film and the lens 22. Accordingly, in the functional liquid crystal film, when an upper part is in the white state, since it is reflected with the free-curved surface mirror 23, in the virtual image display position 24, the virtual image is displayed in a lower part. Further, when the lower part of the functional liquid crystal film is in the white state, in the virtual image display position 24, the virtual image is displayed in the upper part. Accordingly, when the overlook angle is changed vertically, the white state and the transmissive state in the functional liquid crystal film are changed vertically, and the image-processed image is displayed in the white state part, such that it is possible to change the overlook angle. Note that when the overlook angle is changed not only vertically but also horizontally, it is possible to realize the display by changing the white state and the transmissive state in the functional liquid crystal film horizontally and displaying the image-processed image in the white state part. Further, when the virtual image display area shown in FIG. 1C is changed in accordance with change of vehicle speed, it is possible to realize the display by controlling the white state region in the functional liquid crystal film and displaying the image-processed image.

As described above, the present example provides a head-up display device to project a virtual image, with a configuration having an image processor to perform image processing on an image to be displayed as a virtual image, an image display to project the image-processed image, and a display controller to perform display control on the image display. The image display has a projector to project an image, a diffusion plate to image-form the image projected with the projector, and a lens to guide the image image-formed with the diffusion plate. The diffusion plate is formed with a functional liquid crystal film. The display controller controls the transmissive state and the white state in the functional liquid crystal film to display the image-processed image in the white state part, so as to change the position and distance for displaying the virtual image. With this configuration, it is possible to change the overlook angle and the virtual image display area.

EXAMPLE 8

Figure 13:
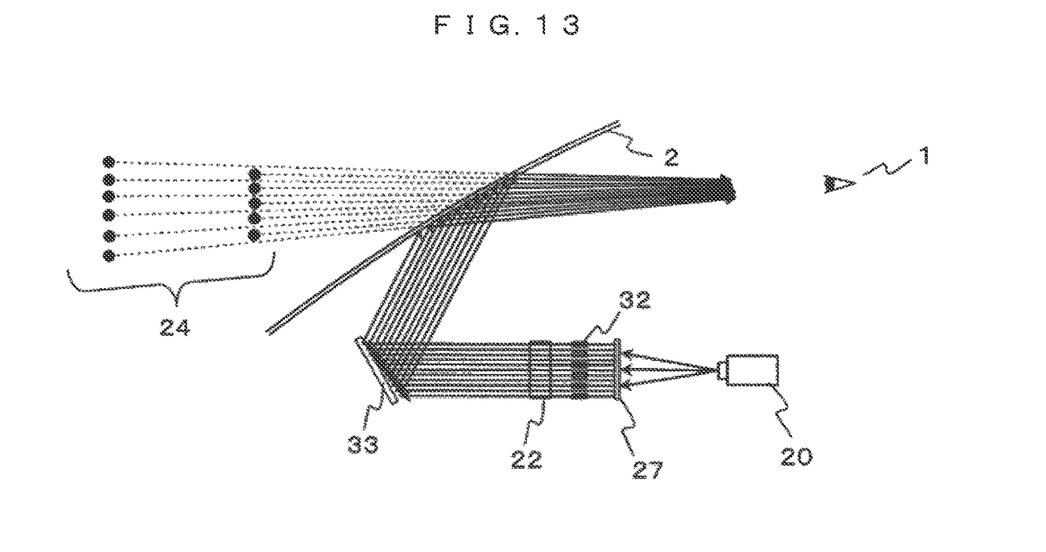
FIG. 13 is a configuration diagram of the image display in an example 8.

In the present example, another configuration of the image display will be described. FIG. 13 is a configuration diagram of the image display in the present example. In FIG. 13, numeral 32 denotes a cribriform optical filter; and 33, a curved surface mirror. The image projected with the projector 20 is image-formed with the diffusion plate 27, and is reflected via the cribriform optical filter 32 and the lens 22 with the curved surface mirror 33. A virtual image is projected in front of the driver 1's eyes via the windshield 2. Note that the cribriform optical filter 32 has the same function as that of the lens. It is inserted by e.g. line of the image projected with the projector 20. It is possible to change the distance for the virtual image by line.

Figure 14:
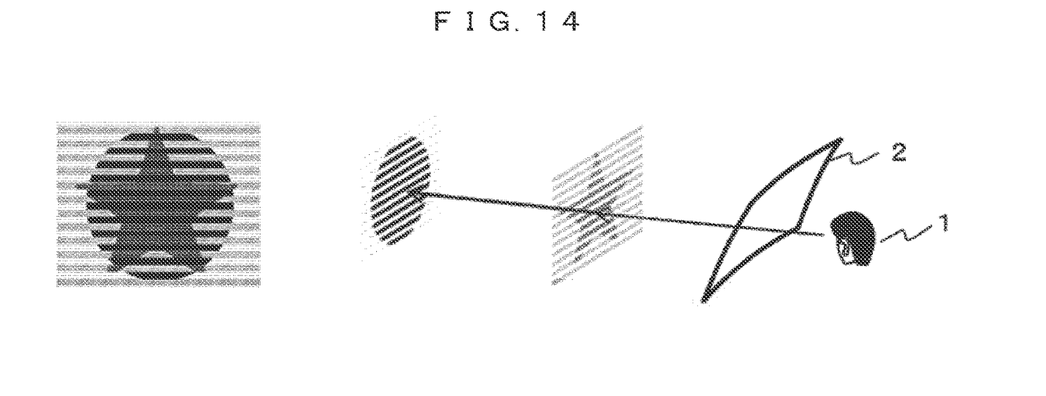
FIG. 14 is an image diagram of virtual image display in the example 8.

FIG. 14 is a display image diagram of a virtual image generated with the configuration in FIG. 13. In FIG. 14, a left figure shows a display image of the virtual image viewed from the driver 1, and a right figure shows a perspective diagram showing a line image by distance for the virtual image. Note that in the present example, the distance for the virtual image is changed by odd number line or even number line; however, the present invention is not limited to this configuration. The distance for the virtual image may be changed by two lines or in arbitrary line unit.

As described above, the present example provides a head-up display device to project a virtual image, with a configuration having an image processor to perform image processing on an image to be displayed as a virtual image, an image display to project the image-processed image, and a display controller to perform display control on the image display. The image display has a projector to project an image, a diffusion plate to image-form the image projected with the projector, and a cribriform optical filter and a lens to guide the image image-formed with the diffusion plate. The cribriform optical filter is inserted by line of the image projected with the projector. In the configuration, it is possible to change the position and distance for displaying the virtual image by line.

With this configuration where the optical filter is a cribriform optical filter, it is possible to change the distance for the virtual image by line.

The present invention is not limited to the above-described examples, but various modifications are included. For example, the above examples have been described in detail for explaining the present invention, and the present invention is not necessarily limited to an example having all the described constituent elements. Further, constituent elements of an example may be added to those of another example. Further, it is possible to perform addition/deletion/replacement with respect to a part of constituent elements of the respective examples with other constituent elements.

REFERENCE SIGNS LIST

1: driver, 2: windshield, 3: instrument panel, 4: HUD display area, 10: vehicle speed detector, 11: image processor, 12: image display, 13: display controller, 20: projector, 21: diffusion plate, 22: lens, 23: free-curved surface mirror, 24: virtual image display position, 25: liquid crystal display, 26: mirror, 27: diffusion plate, 28: movable lens, 29: light control mirror, 30: movable diffusion plate, 31: movable optical filter, 32: cribriform optical filter, 33: curved surface mirror

The invention claimed is:

1. A head-up display device to project a virtual image, comprising:
   an image processor that performs image processing on an image to be described as a virtual image;
   an image display that projects the image-processed image; and
   a display controller that performs display control on the image display,
   wherein the image display has a projector that projects an image, a diffusion plate that image-forms the image projected with the projector, and a lens that guides the image image-formed with the diffusion plate,
   the diffusion plate is formed with a plurality of functional liquid crystal films at different distances from the lens, and
   the display controller controls a transmissive state and a white state of the functional liquid crystal film so as to change a position and a distance for displaying the virtual image.

2. The head-up display device according to claim 1,
   wherein the device is mounted in a vehicle,
   the image display reflects the image guided with the lens or the movable lens with a second mirror, and projects a virtual image from the reflected image, via a windshield of the vehicle,
   the device further comprises a vehicle speed detector that detects a vehicle speed, and
   the display controller performs control in accordance with the vehicle speed.

3. A head-up display device to project a virtual image, comprising:
   an image processor that performs image processing on an image to be displayed as a virtual image;
   an image display that projects the image-processed image; and
   a display controller that performs display control on the image display,
   wherein the image display has a liquid crystal display that displays an image, and a lens provided with a plurality of light control mirrors to reflect or transmit the image displayed with the liquid crystal display, that guides the image from the plurality of light control mirrors,
   the plurality of light control mirrors contain mirrors provided in positions at different distances from the lens and mirrors provided in positions at different distances from the liquid crystal display, and
   the display controller controls reflection and transmission of the plurality of light control mirrors so as to change a position and a distance for displaying the virtual image.

4. The head-up display device according to claim 3,
   wherein the device is mounted in a vehicle,
   the image display reflects the image guided with the lens or the movable lens with a second mirror, and projects a virtual image from the reflected image, via a windshield of the vehicle,
   the device further comprises a vehicle speed detector that detects a vehicle speed, and
   the display controller performs control in accordance with the vehicle speed.

5. A head-up display device to project a virtual image, comprising:
- an image processor that performs image processing on an image to be displayed as a virtual image;
- an image display that projects the image-processed image; and
- a display controller that performs display control on the image display,
- wherein the image display has a projector that projects an image, a diffusion plate that image-forms the image projected with the projector, and a movable optical filter and a lens that guide the image image-formed with the diffusion plate, and
- the display controller inserts/omits the movable optical filter between the lens and the diffusion plate so as to change a position and a distance for displaying the virtual image.

6. The head-up display device according to claim 5,
- wherein the device is mounted in a vehicle,
- the image display reflects the image guided with the lens or the movable lens with a second mirror, and projects a virtual image from the reflected image, via a windshield of the vehicle,
- the device further comprises a vehicle speed detector that detects a vehicle speed, and
- the display controller performs control in accordance with the vehicle speed.

7. A head-up display device to project a virtual image, comprising:
- an image processor that performs image processing on an image to be displayed as a virtual image;
- an image display that projects the image-processed image; and
- a display controller that performs display control on the image display,
- wherein the image display has a projector that projects an image, a diffusion plate that image-forms the image projected with the projector, and a lens that guides the image image-formed with the diffusion plate,
- the diffusion plate is formed with a functional liquid crystal film, and
- the display controller controls a transmissive state and a white state of the functional liquid crystal film, to display the image-processed image in the white state part, so as to change a position and a distance for displaying the virtual image.

8. The head-up display device according to claim 7,
- wherein the device is mounted in a vehicle,
- the image display reflects the image guided with the lens or the movable lens with a second mirror, and projects a virtual image from the reflected image, via a windshield of the vehicle,
- the device further comprises a vehicle speed detector that detects a vehicle speed, and
- the display controller performs control in accordance with the vehicle speed.

9. A head-up display device to project a virtual image, comprising:
- an image processor that performs image processing on an image to be displayed as a virtual image;
- an image display that projects the image-processed image; and
- a display controller that performs display control on the image display,
- wherein the image display has a projector that projects an image, a diffusion plate that image-forms the image projected with the projector, and a cribriform optical filter and a lens that guide the image image-formed with the diffusion plate, and the cribriform optical filter is inserted by line of the image projected with the projector, and it is possible to change a position and a distance for displaying the virtual image by the line.

* * * * *